United States Patent
Nadarajah

(10) Patent No.: US 8,054,849 B2
(45) Date of Patent: Nov. 8, 2011

(54) SYSTEM AND METHOD OF MANAGING VIDEO CONTENT STREAMS

(75) Inventor: Dinesh Nadarajah, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1057 days.

(21) Appl. No.: 11/140,616

(22) Filed: May 27, 2005

(65) Prior Publication Data
US 2006/0268917 A1 Nov. 30, 2006

(51) Int. Cl.
*H04J 3/26* (2006.01)

(52) U.S. Cl. ........ 370/432; 370/217; 370/218; 370/221; 370/242; 370/243; 370/244; 370/390; 725/87; 725/93; 725/94; 725/97; 725/115; 725/139; 725/146; 725/151; 714/4.2; 714/4.3; 714/13

(58) Field of Classification Search ............. 370/390, 370/432, 217–221, 242–244; 725/87, 104, 725/139, 151, 38, 57, 59, 94, 97, 93, 115, 725/146; 714/4.2, 4.3, 13
See application file for complete search history.

(56) References Cited

U.S. PATENT DOCUMENTS

| | | | |
|---|---|---|---|
| 4,243,147 A | 1/1981 | Twitchell et al. | |
| 4,356,509 A | 10/1982 | Skerlos et al. | |
| 4,768,926 A | 9/1988 | Gilbert, Jr. | |
| 4,907,079 A | 3/1990 | Turner et al. | |
| 5,126,731 A | 6/1992 | Cromer, Jr. et al. | |
| 5,163,340 A | 11/1992 | Bender | |
| 5,475,835 A | 12/1995 | Hickey | |
| 5,532,748 A | 7/1996 | Naimpally | |
| 5,541,917 A | 7/1996 | Farris | |
| 5,589,892 A | 12/1996 | Knee et al. | |
| 5,592,477 A | 1/1997 | Farris et al. | |
| 5,610,916 A | 3/1997 | Kostreski et al. | |
| 5,613,012 A | 3/1997 | Hoffman et al. | |
| 5,650,831 A | 7/1997 | Farwell | |
| 5,651,332 A | 7/1997 | Moore et al. | |
| 5,656,898 A | 8/1997 | Kalina | |
| 5,675,390 A | 10/1997 | Schindler et al. | |
| 5,708,961 A | 1/1998 | Hylton et al. | |
| 5,722,041 A | 2/1998 | Freadman | |
| 5,724,106 A | 3/1998 | Autry et al. | |
| 5,729,825 A | 3/1998 | Kostreski et al. | |
| 5,734,853 A | 3/1998 | Hendricks et al. | |

(Continued)

FOREIGN PATENT DOCUMENTS

WO    WO 99/63759 A2    12/1999

(Continued)

OTHER PUBLICATIONS

Koenen, MPEG-4 Overview—ISO/IEC JTC1/SC29/WG11-N4668, Mar. 2002, ISO.*

(Continued)

*Primary Examiner* — Aung S Moe
*Assistant Examiner* — Hoon J Chung
(74) *Attorney, Agent, or Firm* — Toler Law Group

(57) ABSTRACT

A system and method for managing video content streams are disclosed. The method includes receiving a plurality of multicast video streams at a server and buffering each video stream within a memory at the server. The method also includes generating a multicast video output at the server and a unicast video output at the server.

16 Claims, 5 Drawing Sheets

U.S. PATENT DOCUMENTS

| | | | |
|---|---|---|---|
| 5,774,357 A | 6/1998 | Hoffberg et al. | |
| 5,793,438 A | 8/1998 | Bedard | |
| 5,793,895 A * | 8/1998 | Chang et al. | 382/236 |
| 5,805,719 A | 9/1998 | Pare, Jr. et al. | |
| 5,818,438 A | 10/1998 | Howe et al. | |
| 5,838,384 A | 11/1998 | Schindler et al. | |
| 5,838,812 A | 11/1998 | Pare, Jr. et al. | |
| 5,864,757 A | 1/1999 | Parker | |
| 5,867,223 A | 2/1999 | Schindler et al. | |
| 5,892,508 A | 4/1999 | Howe et al. | |
| 5,898,826 A * | 4/1999 | Pierce et al. | 714/4.2 |
| 5,900,867 A | 5/1999 | Schindler et al. | |
| 5,910,970 A | 6/1999 | Lu | |
| 5,933,498 A | 8/1999 | Schneck et al. | |
| 5,940,391 A * | 8/1999 | Malkin et al. | 370/390 |
| 5,941,955 A * | 8/1999 | Wilby et al. | 709/242 |
| 5,953,318 A | 9/1999 | Nattkemper et al. | |
| 5,956,024 A | 9/1999 | Strickland et al. | |
| 5,956,716 A | 9/1999 | Kenner et al. | |
| 5,970,088 A | 10/1999 | Chen | |
| 5,987,061 A | 11/1999 | Chen | |
| 5,990,927 A | 11/1999 | Hendricks et al. | |
| 5,995,155 A | 11/1999 | Schindler et al. | |
| 5,999,518 A | 12/1999 | Nattkemper et al. | |
| 5,999,563 A | 12/1999 | Polley et al. | |
| 6,002,722 A | 12/1999 | Wu | |
| 6,014,184 A | 1/2000 | Knee et al. | |
| 6,021,158 A | 2/2000 | Schurr et al. | |
| 6,021,167 A | 2/2000 | Wu | |
| 6,028,600 A | 2/2000 | Rosin et al. | |
| 6,029,045 A | 2/2000 | Picco et al. | |
| 6,038,251 A | 3/2000 | Chen | |
| 6,044,107 A | 3/2000 | Gatherer et al. | |
| 6,052,120 A | 4/2000 | Nahi et al. | |
| 6,055,268 A | 4/2000 | Timm et al. | |
| 6,072,483 A | 6/2000 | Rosin et al. | |
| 6,084,584 A | 7/2000 | Nahi et al. | |
| 6,111,582 A | 8/2000 | Jenkins | |
| 6,118,498 A | 9/2000 | Reitmeier | |
| 6,122,660 A | 9/2000 | Baransky et al. | |
| 6,124,799 A | 9/2000 | Parker | |
| 6,137,839 A | 10/2000 | Mannering et al. | |
| 6,166,734 A | 12/2000 | Nahi et al. | |
| 6,181,335 B1 | 1/2001 | Hendricks et al. | |
| 6,192,282 B1 | 2/2001 | Smith et al. | |
| 6,195,680 B1 * | 2/2001 | Goldszmidt et al. | 709/203 |
| 6,195,692 B1 | 2/2001 | Hsu | |
| 6,215,483 B1 | 4/2001 | Zigmond | |
| 6,237,022 B1 | 5/2001 | Bruck et al. | |
| 6,243,366 B1 | 6/2001 | Bradley et al. | |
| 6,252,588 B1 | 6/2001 | Dawson | |
| 6,252,989 B1 | 6/2001 | Geisler et al. | |
| 6,260,192 B1 | 7/2001 | Rosin et al. | |
| 6,269,394 B1 | 7/2001 | Kenner et al. | |
| 6,275,268 B1 | 8/2001 | Ellis et al. | |
| 6,275,989 B1 | 8/2001 | Broadwin et al. | |
| 6,281,813 B1 | 8/2001 | Vierthaler et al. | |
| 6,286,142 B1 | 9/2001 | Ehreth | |
| 6,295,057 B1 | 9/2001 | Rosin et al. | |
| 6,311,214 B1 | 10/2001 | Rhoads | |
| 6,314,409 B2 | 11/2001 | Schneck et al. | |
| 6,344,882 B1 | 2/2002 | Shim et al. | |
| 6,357,043 B1 | 3/2002 | Ellis et al. | |
| 6,359,636 B1 | 3/2002 | Schindler et al. | |
| 6,363,149 B1 | 3/2002 | Candelore | |
| 6,385,693 B1 | 5/2002 | Gerszberg et al. | |
| 6,396,480 B1 | 5/2002 | Schindler et al. | |
| 6,396,531 B1 | 5/2002 | Gerszberg et al. | |
| 6,396,544 B1 | 5/2002 | Schindler et al. | |
| 6,397,387 B1 | 5/2002 | Rosin et al. | |
| 6,400,407 B1 | 6/2002 | Zigmond et al. | |
| 6,411,307 B1 | 6/2002 | Rosin et al. | |
| 6,442,285 B2 | 8/2002 | Rhoads et al. | |
| 6,442,549 B1 | 8/2002 | Schneider | |
| 6,449,601 B1 | 9/2002 | Freidland et al. | |
| 6,450,407 B1 | 9/2002 | Freeman et al. | |
| 6,460,075 B2 | 10/2002 | Krueger et al. | |
| 6,463,585 B1 | 10/2002 | Hendricks et al. | |
| 6,481,011 B1 | 11/2002 | Lemmons | |
| 6,486,892 B1 | 11/2002 | Stern | |
| 6,492,913 B2 | 12/2002 | Vierthaler et al. | |
| 6,496,983 B1 | 12/2002 | Schindler et al. | |
| 6,502,242 B1 | 12/2002 | Howe et al. | |
| 6,505,348 B1 | 1/2003 | Knowles et al. | |
| 6,510,519 B2 | 1/2003 | Wasilewski et al. | |
| 6,515,680 B1 | 2/2003 | Hendricks et al. | |
| 6,516,467 B1 | 2/2003 | Schindler et al. | |
| 6,519,011 B1 | 2/2003 | Shendar | |
| 6,522,769 B1 | 2/2003 | Rhoads et al. | |
| 6,526,577 B1 | 2/2003 | Knudson et al. | |
| 6,529,949 B1 | 3/2003 | Getsin et al. | |
| 6,535,590 B2 | 3/2003 | Tidwell et al. | |
| 6,538,704 B1 | 3/2003 | Grabb et al. | |
| 6,542,740 B1 | 4/2003 | Olgaard et al. | |
| 6,557,030 B1 | 4/2003 | Hoang | |
| 6,567,982 B1 | 5/2003 | Howe et al. | |
| 6,587,873 B1 | 7/2003 | Nobakht et al. | |
| 6,598,231 B1 | 7/2003 | Basawapatna et al. | |
| 6,599,199 B1 | 7/2003 | Hapshie | |
| 6,607,136 B1 | 8/2003 | Atsmon et al. | |
| 6,609,253 B1 | 8/2003 | Swix et al. | |
| 6,611,537 B1 | 8/2003 | Edens et al. | |
| 6,614,987 B1 | 9/2003 | Ismail et al. | |
| 6,622,148 B1 | 9/2003 | Noble et al. | |
| 6,622,307 B1 | 9/2003 | Ho | |
| 6,631,523 B1 | 10/2003 | Matthews, III et al. | |
| 6,640,239 B1 | 10/2003 | Gidwani | |
| 6,643,495 B1 | 11/2003 | Gallery et al. | |
| 6,643,684 B1 | 11/2003 | Malkin et al. | |
| 6,650,761 B1 | 11/2003 | Rodriguez et al. | |
| 6,658,568 B1 | 12/2003 | Ginter et al. | |
| 6,678,215 B1 | 1/2004 | Treyz et al. | |
| 6,678,733 B1 | 1/2004 | Brown et al. | |
| 6,690,392 B1 | 2/2004 | Wugoski | |
| 6,693,236 B1 | 2/2004 | Gould et al. | |
| 6,701,453 B2 | 3/2004 | Chrabaszcz | |
| 6,701,523 B1 | 3/2004 | Hancock et al. | |
| 6,704,931 B1 | 3/2004 | Schaffer et al. | |
| 6,711,741 B2 * | 3/2004 | Yeo | 725/87 |
| 6,714,264 B1 | 3/2004 | Kempisty | |
| 6,725,281 B1 | 4/2004 | Zintel et al. | |
| 6,731,393 B1 | 5/2004 | Currans et al. | |
| 6,732,179 B1 | 5/2004 | Brown et al. | |
| 6,745,223 B1 | 6/2004 | Nobakht et al. | |
| 6,745,392 B1 | 6/2004 | Basawapatna et al. | |
| 6,754,206 B1 | 6/2004 | Nattkemper et al. | |
| 6,756,997 B1 | 6/2004 | Ward, III et al. | |
| 6,760,918 B2 | 7/2004 | Rodriguez et al. | |
| 6,763,226 B1 | 7/2004 | McZeal, Jr. | |
| 6,765,557 B1 | 7/2004 | Segal et al. | |
| 6,766,305 B1 | 7/2004 | Fucarile et al. | |
| 6,769,128 B1 | 7/2004 | Knee et al. | |
| 6,771,317 B2 | 8/2004 | Ellis et al. | |
| 6,773,344 B1 | 8/2004 | Gabai et al. | |
| 6,778,559 B2 | 8/2004 | Hyakutake | |
| 6,779,004 B1 | 8/2004 | Zintel | |
| 6,781,518 B1 | 8/2004 | Hayes et al. | |
| 6,784,804 B1 | 8/2004 | Hayes et al. | |
| 6,785,716 B1 | 8/2004 | Nobakht | |
| 6,788,709 B1 | 9/2004 | Hyakutake | |
| 6,804,824 B1 | 10/2004 | Potrebic et al. | |
| 6,826,775 B1 | 11/2004 | Howe et al. | |
| 6,828,993 B1 | 12/2004 | Hendricks et al. | |
| 6,909,874 B2 | 6/2005 | Holtz et al. | |
| 6,938,021 B2 | 8/2005 | Shear et al. | |
| 7,020,709 B1 * | 3/2006 | Sloss | 709/231 |
| 2001/0011261 A1 | 8/2001 | Mullen-Schultz | |
| 2001/0016945 A1 | 8/2001 | Inoue | |
| 2001/0016946 A1 | 8/2001 | Inoue | |
| 2001/0034664 A1 | 10/2001 | Brunson | |
| 2001/0037472 A1 * | 11/2001 | Li | 714/4 |
| 2001/0044794 A1 | 11/2001 | Nasr et al. | |
| 2001/0048677 A1 | 12/2001 | Boys | |
| 2001/0049826 A1 | 12/2001 | Wilf | |
| 2001/0054008 A1 | 12/2001 | Miller et al. | |
| 2001/0054009 A1 | 12/2001 | Miller et al. | |
| 2001/0054067 A1 | 12/2001 | Miller et al. | |

| | | | | | |
|---|---|---|---|---|---|
| 2001/0056350 A1 | 12/2001 | Calderone et al. | 2003/0100340 A1 | 5/2003 | Cupps et al. |
| 2002/0001303 A1 | 1/2002 | Boys | 2003/0110161 A1 | 6/2003 | Schneider |
| 2002/0001310 A1 | 1/2002 | Mai et al. | 2003/0110503 A1 | 6/2003 | Perkes |
| 2002/0002496 A1 | 1/2002 | Miller et al. | 2003/0126136 A1 | 7/2003 | Omoigui |
| 2002/0003166 A1 | 1/2002 | Miller et al. | 2003/0135771 A1 | 7/2003 | Cupps et al. |
| 2002/0007307 A1 | 1/2002 | Miller et al. | 2003/0141987 A1 | 7/2003 | Hayes |
| 2002/0007313 A1 | 1/2002 | Mai et al. | 2003/0142670 A1 | 7/2003 | Gould et al. |
| 2002/0007485 A1 | 1/2002 | Rodriguez et al. | 2003/0145321 A1 | 7/2003 | Bates et al. |
| 2002/0010639 A1 | 1/2002 | Howey et al. | 2003/0149989 A1 | 8/2003 | Hunter et al. |
| 2002/0010745 A1 | 1/2002 | Schneider | 2003/0153353 A1 | 8/2003 | Cupps et al. |
| 2002/0010935 A1 | 1/2002 | Sitnik | 2003/0153354 A1 | 8/2003 | Cupps et al. |
| 2002/0016736 A1 | 2/2002 | Cannon et al. | 2003/0159026 A1 | 8/2003 | Cupps et al. |
| 2002/0022963 A1 | 2/2002 | Miller et al. | 2003/0160830 A1 | 8/2003 | DeGross |
| 2002/0022970 A1 | 2/2002 | Noll et al. | 2003/0163601 A1 | 8/2003 | Cupps et al. |
| 2002/0022992 A1 | 2/2002 | Miller et al. | 2003/0163666 A1 | 8/2003 | Cupps et al. |
| 2002/0022993 A1 | 2/2002 | Miller et al. | 2003/0172380 A1 | 9/2003 | Kikinis |
| 2002/0022994 A1 | 2/2002 | Miller et al. | 2003/0182237 A1 | 9/2003 | Costa et al. |
| 2002/0022995 A1 | 2/2002 | Miller et al. | 2003/0182420 A1 | 9/2003 | Jones et al. |
| 2002/0023959 A1 | 2/2002 | Miller et al. | 2003/0185232 A1 | 10/2003 | Moore et al. |
| 2002/0026357 A1 | 2/2002 | Miller et al. | 2003/0187641 A1 | 10/2003 | Moore et al. |
| 2002/0026358 A1 | 2/2002 | Miller et al. | 2003/0187646 A1 | 10/2003 | Smyers et al. |
| 2002/0026369 A1 | 2/2002 | Miller et al. | 2003/0187800 A1 | 10/2003 | Moore et al. |
| 2002/0026475 A1 | 2/2002 | Marmor | 2003/0189509 A1 | 10/2003 | Hayes et al. |
| 2002/0029181 A1 | 3/2002 | Miller et al. | 2003/0189589 A1 | 10/2003 | LeBlanc et al. |
| 2002/0030105 A1 | 3/2002 | Miller et al. | 2003/0194141 A1 | 10/2003 | Kortum et al. |
| 2002/0032603 A1 | 3/2002 | Yeiser | 2003/0194142 A1 | 10/2003 | Kortum et al. |
| 2002/0035404 A1 | 3/2002 | Ficco et al. | 2003/0208396 A1 | 11/2003 | Miller et al. |
| 2002/0040475 A1 | 4/2002 | Yap et al. | 2003/0208758 A1 | 11/2003 | Schein et al. |
| 2002/0042915 A1 | 4/2002 | Kubischta et al. | 2003/0226044 A1 | 12/2003 | T. Cupps et al. |
| 2002/0046093 A1 | 4/2002 | Miller et al. | 2003/0226145 A1 | 12/2003 | Marsh |
| 2002/0049635 A1 | 4/2002 | Mai et al. | 2003/0229900 A1 | 12/2003 | Reisman |
| 2002/0054087 A1 | 5/2002 | Noll et al. | 2004/0003041 A1 | 1/2004 | Moore et al. |
| 2002/0054750 A1 | 5/2002 | Ficco et al. | 2004/0003403 A1 | 1/2004 | Marsh |
| 2002/0059163 A1 | 5/2002 | Smith | 2004/0006769 A1 | 1/2004 | Ansari et al. |
| 2002/0059425 A1 | 5/2002 | Belfiore et al. | 2004/0006772 A1 | 1/2004 | Ansari et al. |
| 2002/0059599 A1 | 5/2002 | Schein et al. | 2004/0010602 A1 | 1/2004 | Van Vleck et al. |
| 2002/0059619 A1* | 5/2002 | Lebar ............................ 725/87 | 2004/0015997 A1 | 1/2004 | Ansari et al. |
| 2002/0065717 A1 | 5/2002 | Miller et al. | 2004/0030750 A1 | 2/2004 | Moore et al. |
| 2002/0067438 A1 | 6/2002 | Baldock | 2004/0031058 A1 | 2/2004 | Reisman |
| 2002/0069220 A1 | 6/2002 | Tran | 2004/0031856 A1 | 2/2004 | Atsmon et al. |
| 2002/0069282 A1 | 6/2002 | Reisman | 2004/0034877 A1 | 2/2004 | Nogues |
| 2002/0069294 A1 | 6/2002 | Herkersdorf et al. | 2004/0042479 A1 | 3/2004 | Epstein et al. |
| 2002/0072970 A1 | 6/2002 | Miller et al. | 2004/0049728 A1 | 3/2004 | Langford |
| 2002/0078442 A1 | 6/2002 | Reyes et al. | 2004/0064351 A1 | 4/2004 | Mikurak |
| 2002/0097261 A1 | 7/2002 | Gottfurcht et al. | 2004/0068740 A1 | 4/2004 | Fukuda et al. |
| 2002/0106119 A1 | 8/2002 | Foran et al. | 2004/0068753 A1 | 4/2004 | Robertson et al. |
| 2002/0112239 A1 | 8/2002 | Goldman | 2004/0070491 A1 | 4/2004 | Huang et al. |
| 2002/0114331 A1 | 8/2002 | Cheung et al. | 2004/0073918 A1 | 4/2004 | Ferman et al. |
| 2002/0116392 A1 | 8/2002 | McGrath et al. | 2004/0098571 A1 | 5/2004 | Falcon |
| 2002/0124055 A1 | 9/2002 | Reisman | 2004/0107125 A1 | 6/2004 | Guheen et al. |
| 2002/0128061 A1 | 9/2002 | Blanco | 2004/0107439 A1 | 6/2004 | Hassell et al. |
| 2002/0129094 A1 | 9/2002 | Reisman | 2004/0111745 A1 | 6/2004 | Schein et al. |
| 2002/0133402 A1 | 9/2002 | Faber et al. | 2004/0111756 A1 | 6/2004 | Stuckman et al. |
| 2002/0138840 A1 | 9/2002 | Schein et al. | 2004/0117813 A1 | 6/2004 | Karaoguz et al. |
| 2002/0152264 A1 | 10/2002 | Yamasaki | 2004/0117824 A1 | 6/2004 | Karaoguz et al. |
| 2002/0169611 A1 | 11/2002 | Guerra et al. | 2004/0128342 A1 | 7/2004 | Maes et al. |
| 2002/0170063 A1 | 11/2002 | Ansari et al. | 2004/0139173 A1 | 7/2004 | Karaoguz et al. |
| 2002/0173344 A1 | 11/2002 | Cupps et al. | 2004/0143600 A1 | 7/2004 | Musgrove et al. |
| 2002/0188955 A1 | 12/2002 | Thompson et al. | 2004/0143652 A1 | 7/2004 | Grannan et al. |
| 2002/0193997 A1 | 12/2002 | Fitzpatrick et al. | 2004/0148408 A1 | 7/2004 | Nadarajah |
| 2002/0194601 A1 | 12/2002 | Perkes et al. | 2004/0150676 A1 | 8/2004 | Gottfurcht et al. |
| 2002/0198874 A1 | 12/2002 | Nasr et al. | 2004/0183839 A1 | 9/2004 | Gottfurcht et al. |
| 2003/0005445 A1 | 1/2003 | Schein et al. | 2004/0194136 A1 | 9/2004 | Finseth et al. |
| 2003/0009771 A1 | 1/2003 | Chang | 2004/0198386 A1 | 10/2004 | Dupray |
| 2003/0012365 A1 | 1/2003 | Goodman | 2004/0201600 A1 | 10/2004 | Kakivaya et al. |
| 2003/0014750 A1 | 1/2003 | Kamen | 2004/0210633 A1 | 10/2004 | Brown et al. |
| 2003/0018975 A1 | 1/2003 | Stone | 2004/0210935 A1 | 10/2004 | Schein et al. |
| 2003/0023435 A1 | 1/2003 | Josephson | 2004/0213271 A1 | 10/2004 | Lovy et al. |
| 2003/0023440 A1 | 1/2003 | Chu | 2004/0221302 A1 | 11/2004 | Ansari et al. |
| 2003/0028890 A1 | 2/2003 | Swart et al. | 2004/0223485 A1 | 11/2004 | Arellano et al. |
| 2003/0033416 A1 | 2/2003 | Schwartz | 2004/0226035 A1 | 11/2004 | Hauser, Jr. |
| 2003/0043915 A1 | 3/2003 | Costa et al. | 2004/0226045 A1 | 11/2004 | Nadarajah |
| 2003/0046091 A1 | 3/2003 | Arneson et al. | 2004/0239624 A1 | 12/2004 | Ramian |
| 2003/0046689 A1 | 3/2003 | Gaos | 2004/0252119 A1 | 12/2004 | Hunleth et al. |
| 2003/0056223 A1 | 3/2003 | Costa et al. | 2004/0252120 A1 | 12/2004 | Hunleth et al. |
| 2003/0058277 A1 | 3/2003 | Bowman-Amuah | 2004/0252769 A1 | 12/2004 | Costa et al. |
| 2003/0061611 A1 | 3/2003 | Pendakur | 2004/0252770 A1 | 12/2004 | Costa et al. |
| 2003/0071792 A1 | 4/2003 | Safadi | 2004/0260407 A1 | 12/2004 | Wimsatt |
| 2003/0093793 A1 | 5/2003 | Gutta | 2004/0261116 A1 | 12/2004 | McKeown et al. |

| | | |
|---|---|---|
| 2004/0267729 A1 | 12/2004 | Swaminathan et al. |
| 2004/0268393 A1 | 12/2004 | Hunleth et al. |
| 2005/0027851 A1 | 2/2005 | McKeown et al. |
| 2005/0038814 A1 | 2/2005 | Iyengar et al. |
| 2005/0044280 A1 | 2/2005 | Reisman |
| 2005/0081244 A1* | 4/2005 | Barrett et al. ............... 725/97 |
| 2005/0097612 A1 | 5/2005 | Pearson et al. |
| 2005/0132295 A1 | 6/2005 | Noll et al. |
| 2005/0190781 A1 | 9/2005 | Green et al. |
| 2005/0195961 A1 | 9/2005 | Pasquale et al. |
| 2006/0075428 A1* | 4/2006 | Farmer et al. ............... 725/38 |
| 2006/0200576 A1* | 9/2006 | Pickens et al. ............. 709/231 |
| 2007/0107026 A1* | 5/2007 | Sherer et al. ............... 725/97 |

FOREIGN PATENT DOCUMENTS

| | | |
|---|---|---|
| WO | WO 00/28689 A2 | 5/2000 |
| WO | WO 01/60066 A1 | 8/2001 |
| WO | WO 02/17627 A2 | 2/2002 |
| WO | 02/49359 A1 | 6/2002 |
| WO | WO 02/058382 A1 | 7/2002 |
| WO | 02/067120 A1 | 8/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

ISO Information Technology—Generic Coding of Moving Pictures and Associated Audio Information: Systems—ISO/IEC 13818-1:2000, Dec. 1, 2000, ISO.*
Microsoft, Using Secondary Servers, Jan. 21, 2005, Microsoft TechNet.*
Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.
U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/148,967, filed Jun. 9, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
International Search Report for International Application No. PCT/US06/17106, mailed on Sep. 5, 2007.
Written Opinion of the International Searching Authority for International Application No. PCT/US06/17106, mailed on Sep. 5, 2007.
European Search Report mailed on Jun. 3, 2009.
Canadian Office Action mailed on Apr. 28, 2009.
EPO Communication for Application No. 06752201.1-2416/1884083, dated Aug. 5, 2009, 5 pp.

* cited by examiner

SYSTEM AND METHOD OF MANAGING VIDEO CONTENT STREAMS

FIELD OF THE DISCLOSURE

The present disclosure relates generally to systems and methods for managing video content streams.

BACKGROUND

In a typical analog type cable broadcast video service, channel switching is nearly instantaneous. In a digital cable system, the channel change time may be somewhat greater, because of the time to tune to the correct frequency and to extract the digital bit stream from the transport stream. In a typical system, the video program stream is identified, extracted and decoded for display. Channel change times for a satellite based Direct Broadcast System may be similar to the times for the digital cable system. The channel change time can be affected by the location of the channel in the transponder and the satellite. For example, if the next channel is on a separate transponder and on a separate satellite, then the switch matrix may have to make a transition between satellites before delivering the channel bit stream to the decoder and hence further increasing the channel change time.

Video content may be delivered over an Internet protocol (IP) network. In an IP network, each channel of a broadcast TV service may be delivered as an IP multicast stream. A set top box connected to the network can request the network for membership to a member of a multicast group/channel. After receiving a channel change request from a user, the set top box leaves the multicast group channel and joins a new multicast group channel associated with the channel change request. This process can take several seconds longer than the channel change times for other video delivery formats. This delay time between channel changes may result in a poor user experience.

Accordingly, there is a need for a system and method to provide fast channel change times for distributed video content.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A system and method for managing video content streams are disclosed. The method includes receiving a plurality of multicast video streams at a server and buffering each video stream within a memory at the server. The method also includes generating a multicast video output at the server and a unicast video output at the server.

In a particular embodiment, the method includes communicating the multicast video output from the server to a plurality of set top boxes. In another particular embodiment the unicast video output is communicated to a single set top box. In yet another particular embodiment, the single set top box is one of the plurality of set top boxes.

In a particular embodiment, the method includes receiving a channel request at the server from a set top box and generating unicast video output from a buffered multicast video stream associated with the requested channel. In another particular embodiment, the method includes communicating the unicast video output to the set top box. In another particular embodiment, the method includes joining the set top box to a multicast group associated with the requested channel. In yet another particular embodiment, a multicast video output associated with the multicast group is communicated to the set top box.

In a particular embodiment, the disclosed method includes sending a channel change request corresponding to a selected channel to a first server, receiving a unicast video output corresponding to the selected channel from the first server, and receiving a multicast video output corresponding to the new channel from the first server after receiving the unicast video output.

The disclosed system includes a server including a processor, a computer readable storage medium accessible by the processor, and a computer program embedded within the computer readable storage medium. In a particular embodiment, the computer program includes instructions to buffer a plurality of multicast video streams within a plurality of buffers, instructions to generate at least one multicast video output from one of the plurality multicast video streams and instructions to generate a unicast video output from the one of the plurality of multicast video streams.

In another particular embodiment, the disclosed system includes a set top box including a processor, a computer readable storage medium accessible by the processor, and a computer program embedded within the computer readable storage medium. The computer program includes instructions to receive a channel change request, instructions to transmit the channel change request to a first server, instructions to receive a unicast video output associated with a requested channel while the first server joins the set top box to a multicast group associated with the requested channel and instructions to receive a multicast video output from the first server after the first server joins the set top box to the multicast group.

Figure 1:
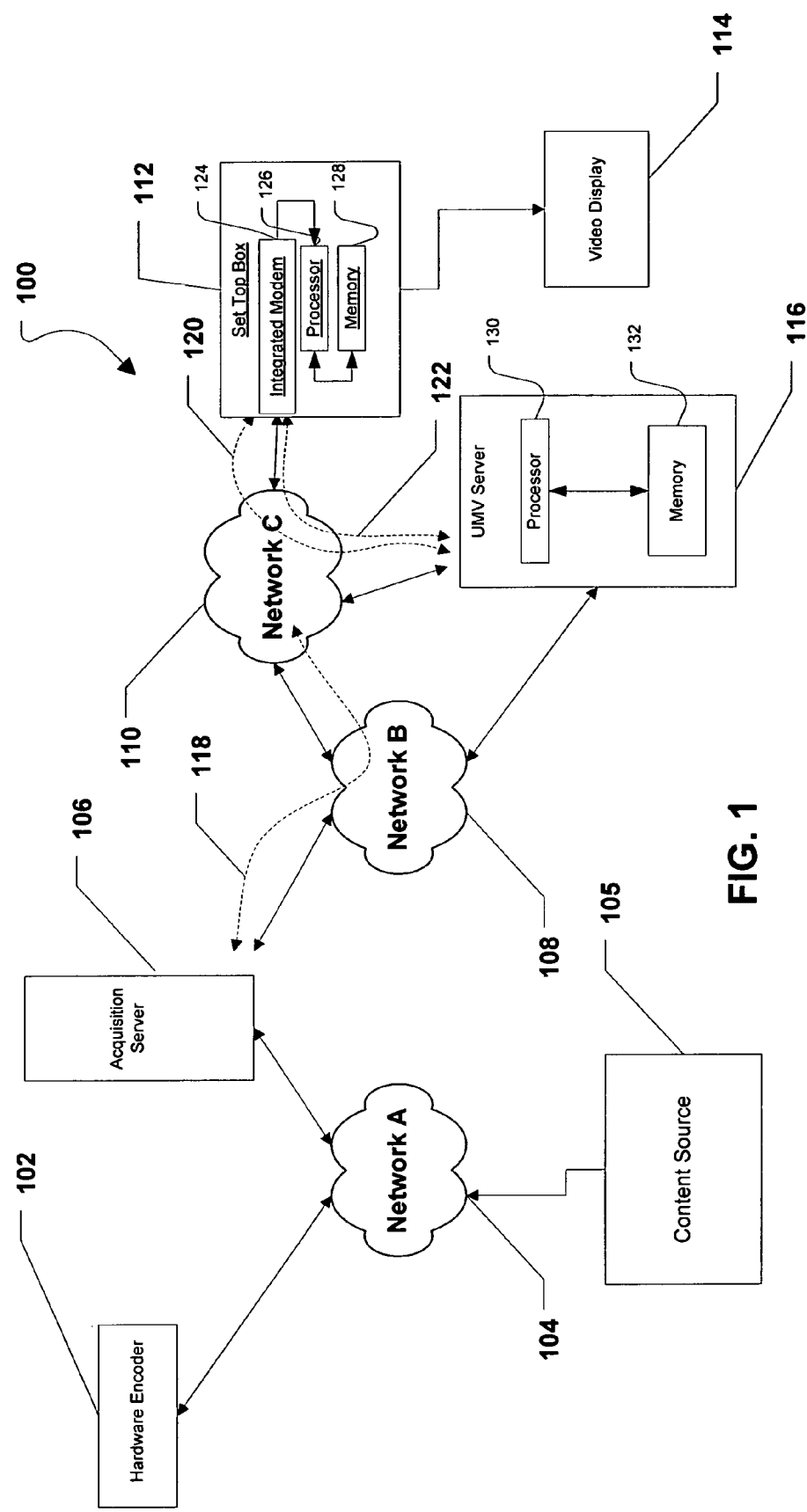
FIG. 1 is a diagram of an exemplary video content network.

Referring to FIG. 1, a particular embodiment of a video content network 100 is illustrated. The video content network includes a hardware encoder 102 that can be coupled to a first IP network 104. In addition, the first IP network 104 can be coupled to a content source 105 and an acquisition server 106. Further, the acquisition server 106 can be coupled to a second IP network 108 and to a third IP network 110. Moreover, the third IP network 110 can be coupled to a set top box 112. The set top box 112 can be coupled to a video display 114.

As illustrated, the second IP network 108 can be coupled to a unicast-multicast video (UMV) server 116. In addtion, the acquisition server 106 can provide a multicast video stream 118 to the UMV server 116 via the second IP network 108 and the third IP network 110. Furthermore, the UMV 116 server can provide a unicast video stream 120 and a multicast video stream 122 to the set top box 112.

In the particular illustrated embodiment, the set top box 112 includes an integrated modem 124, a processor 126, and a computer readable medium, such as a memory 128. Furthermore, the UMV server 116 can include a processor 130 coupled to a computer readable medium such as a memory 132.

It will be appreciated that the first IP network 104, the second IP network 108, and the third IP network 110 are depicted separately to illustrate the logical separation of different types of video traffic. In a particular embodiment, all of the traffic may be deployed on a single IP network.

In a particular embodiment, the hardware encoder 102 encodes a video content stream provided by the video content source 105. The video content source can include a multicast-capable Internet video service or other appropriate content source. As illustrated, the hardware encoder 102 can transmit the encoded video content stream to the acquisition server 106. Furthermore, the acquisition server 106 can process the video content stream by applying digital rights management (DRM) and generating a picture in picture (PIP) stream. In addition, the acquisition server can provide the multicast stream 118 based on the processed video content stream.

In a particular embodiment, the multicast content stream 118 is received at the UMV server 116. Further, the UMV server 116 can buffer the multicast video content stream 118. In addition, based on the buffered multicast video content stream 118, the UMV server 116 can provide the unicast video content stream 120 and a multicast video content stream 122. In an exemplary embodiment, the set top box 112 can receive the unicast video content stream 120 and the multicast video content stream 122 and display one or more of these streams at video display 114.

In a particular embodiment, the memory 128 of the set top box 112 is accessible to the processor 126. In addition, a computer program can be embedded in the memory 128. In a particular embodiment, the computer program includes instructions to receive a channel change request, instructions to transmit an output that includes the channel change request to a first server, such as the UMV server 116, and instructions to receive a unicast video output, such as the unicast video stream 120. In a particular embodiment, the unicast video output is associated with a requested channel. In another particular embodiment, the unicast video output is received while the server joins the set top box to a multicast group associated with the requested channel. In yet another particular embodiment, the computer program includes instructions to receive a multicast video output, such as the multicast video content stream 122, from the first server after the first server joins the set top box 112 to the multicast group.

In another particular embodiment, the computer program includes instructions to sense when the first server is out of service and instructions to receive a multicast video stream, such as the multicast video stream 118, from a second server, such as the acquisition server 106, in response to the first server being out of service. In a particular embodiment, instructions to sense when the first server has returned to service and instructions to receive the multicast video output from the first server in response to the first server being returned to service.

As illustrated in FIG. 1, the UMV server 116 can include the memory 132 that is accessible to the processor 130. Furthermore, a computer program can be embedded in the memory 132. In a particular embodiment, the computer program includes instructions to buffer a plurality of multicast video streams, such as multicast video content stream 118, within a plurality of buffers, instructions to generate at least one multicast video output, such as the multicast video stream 122 from the plurality of buffers, and instructions to generate at least one unicast video output, such as the unicast video stream 120 from the plurality of multicast video streams. In another particular embodiment, the computer program includes instructions to receive a channel change request from a set top box, such as the set top box 112. In yet another particular embodiment, the computer program includes instructions to generate a unicast video output from a buffered multicast video stream within the server. In a particular embodiment, the buffered multicast video stream corresponds to a requested channel. In another particular embodiment, the computer program includes instructions to join the set-top box 112 to a multicast group at the server 116. In a particular embodiment, the multicast group corresponds to the requested channel. In yet another particular embodiment, the computer program includes instructions to transmit a multicast video output associated with the multicast group to the set top box.

Figure 2:
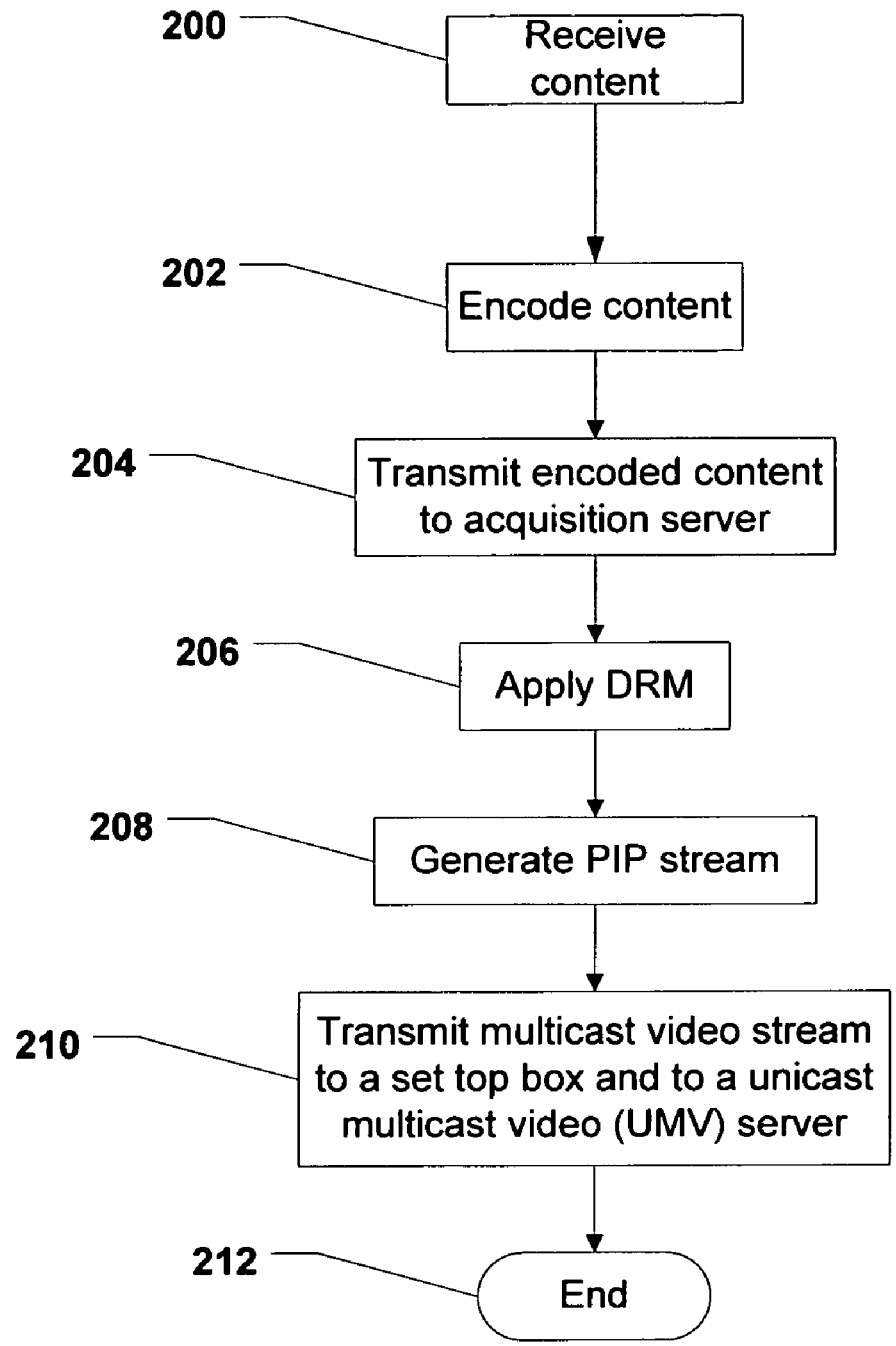
FIG. 2 is a flow chart to illustrate an exemplary method of producing a multicast video content stream.

Referring to FIG. 2, an exemplary method of producing a multicast video content stream is illustrated. At step 200, a hardware encoder receives video content. Proceeding to step 202, the video content is encoded by the hardware encoder and, at step 204, the encoded content is transmitted to an acquisition server. Moving to step 206, the acquisition server applies Digital Rights Management to the video content and, at step 208, the acquisition server generates a picture-in-picture (PIP) stream. Proceeding to step 210, the acquisition server transmits a multicast video stream to a UMV server. The method then ends at step 212.

Figure 3:
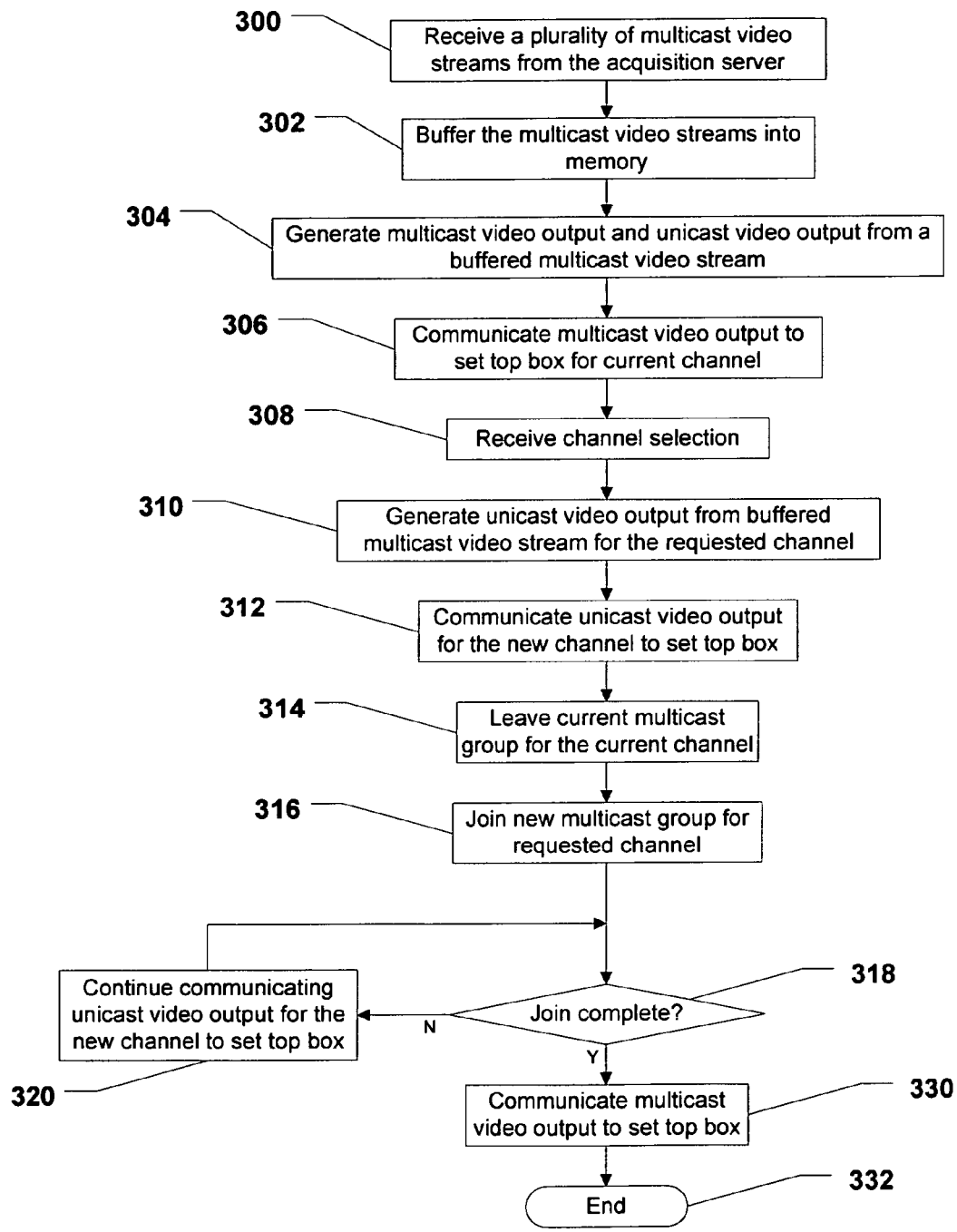
FIG. 3 is a flow chart to illustrate an exemplary method of managing both multicast and unicast video content streams.

Referring to FIG. 3, an exemplary method of managing both multicast and unicast video content streams is illustrated. As illustrated, at step 300, a UMV server receives a plurality of multicast video streams from an acquisition server. Moving to step 302, the UMV server buffers the plurality of multicast video streams into memory. Next, at step 304, the UMV server generates a multicast video output and a unicast video output from a buffered multicast video stream. At step 306, the multicast video output for a current channel is communicated from the UMV server to a plurality of set top boxes.

Proceeding to step 308, a request for a channel from a set top box is received by the UMV server. At step 310, a unicast video output is generated within the UMV server. In a particular embodiment, the unicast video output is generated from a buffered multicast video stream for the requested channel. Moving to step 312, the unicast video output is communicated from the UMV server to a set top box. At step 314, the set top box leaves the current multicast group for the current channel. Proceeding to step 316, the UMV server joins the set top box to a multicast group associated with the requested channel. Moving to decision step 318, the UMV server determines if the set top box has been joined to the multicast group associated with the requested channel. If the join is not complete, at step 320 the UMV server continues communicating the unicast video output for the new channel to the set top box and returns to step 318.

Returning to decision step 318, if the UMV server determines that the join is complete, the method proceeds to step 330 and the UMV server communicates a multicast video output associated with the requested channel to the set top box. In a particular embodiment, the multicast video output is generated from the buffered multicast video stream. The method ends at step 332.

Figure 4:
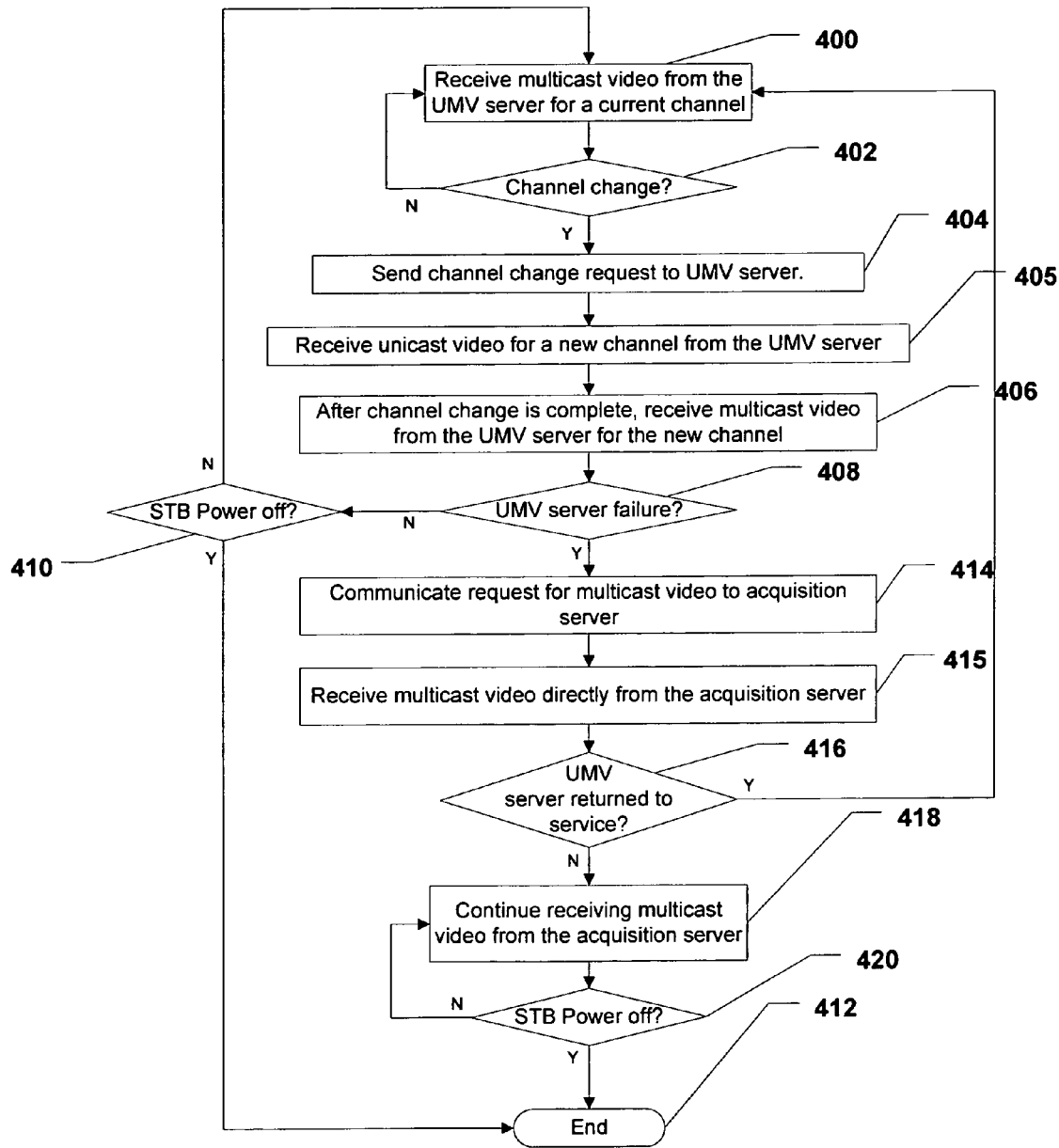
FIG. 4 is a flow chart to illustrate an exemplary embodiment of a method of managing video content streams in the event of a server failure.

Referring to FIG. 4, an exemplary embodiment of a method of managing video content streams in the event of a server failure is illustrated. At step 400, a set top box receives a multicast video output for a current channel from a UMV server. Proceeding to decision step 402, the set top box determines if a channel change request has been received. If no channel change request has been received, the method returns to step 400. If a channel change request has been received, the set top box sends a channel change request to a UMV server at step 404. In a particular embodiment, the channel change request is sent in response to a channel selection at the set top box. Proceeding to step 405, the set top box receives from the UMV server a unicast video output for the new channel. At step 406, after the channel change operation is complete the set top box receives a multicast video output for the new channel. In a particular embodiment, the unicast video output and the multicast video output are both based on a buffered multicast video stream.

Moving to decision step 408, the set top box determines whether the UMV server has failed. If the UMV server has not failed, the method proceeds to step 410 and the UMV server determines if the set top box power is off. If the set top box power is on, the method returns to step 400. If the set top box power is off, the method proceeds to step 412 and ends.

Returning to step 408, if the UMV server has failed, the method proceeds to step 414 and the set top box communicates a request for a multicast video stream from the acquisition server. Moving to step 415, the set top box receives the multicast video output from the acquisition server.

Proceeding to decision step 416, the set top box detects whether the UMV server has returned to service. If the UMV server has returned to service, the method proceeds to step 400 and the set top box receives the multicast video output from the UMV server. If, at decision step 416, the UMV has not been returned to service, the method proceeds to step 418 and continues receiving the multicast video output from the acquisition server. The method then proceeds to decision step 420 and determines whether the power to the set top box is turned off. If the power at the set top box is turned on, the method returns to step 418 and continues to receive the multicast video from the acquisition server. If the power to the set top box is turned off at decision step 420, the method moves to step 412 and ends.

Figure 5:
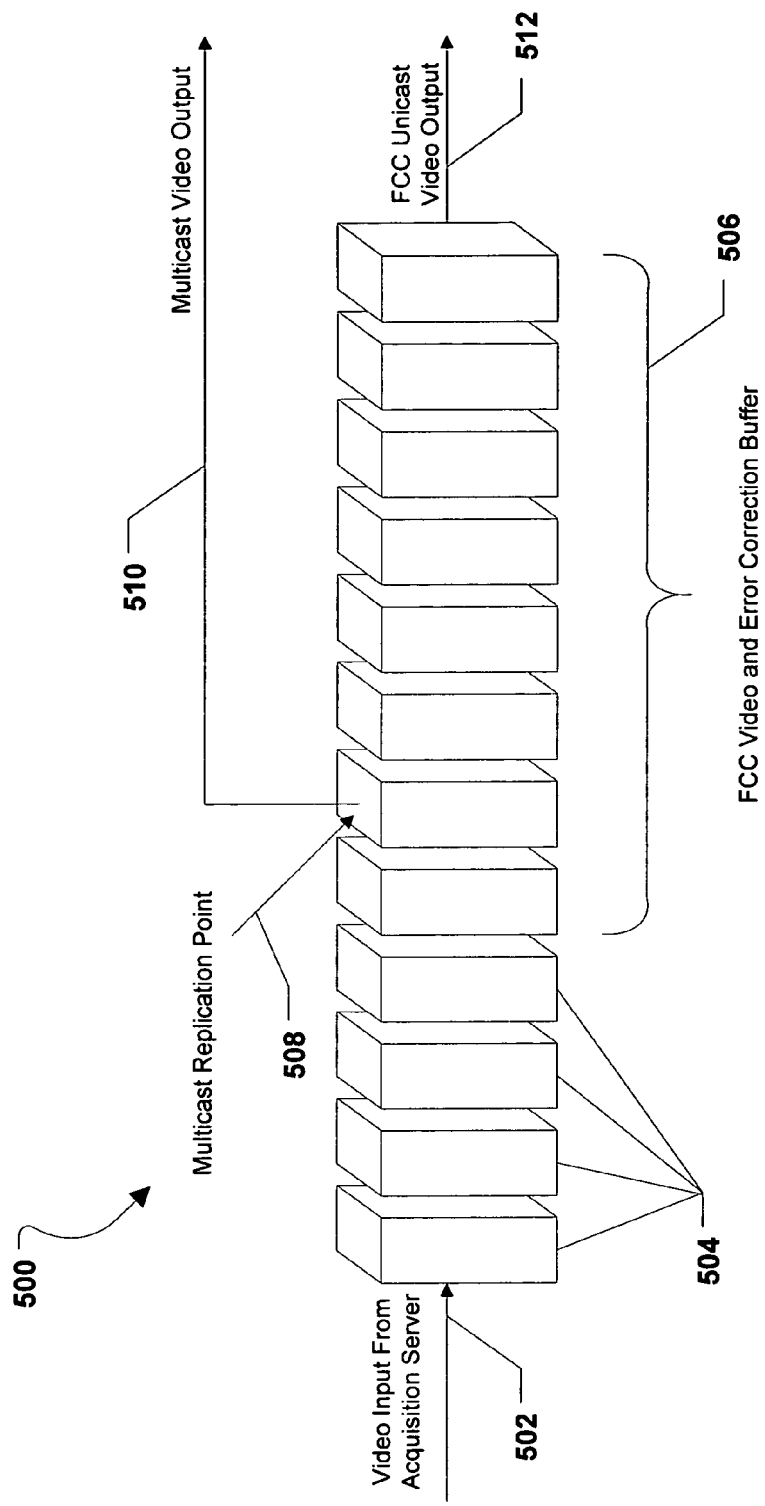
FIG. 5 is a block diagram of a memory architecture including multicast and unicast video streams.

Referring to FIG. 5, an exemplary embodiment of a memory architecture including both multicast and unicast video content streams is illustrated. The architecture includes a buffered data stream 500. In a particular embodiment, the buffered data stream 500 receives a video input 502 from an acquisition server. Furthermore, the buffered data stream 500 includes a series of data packets 504. In addition, the buffered data stream 500 includes a fast channel change (FCC) and error correction buffer 506. The buffered data stream 512 further includes a multicast replication point 508 to produce a multicast video output 510. Moreover, the buffered data stream 500 includes an FCC unicast video output 512.

The buffered data stream 500 can be accessed at the multicast replication point 508 to provide the multicast video output 510 to a plurality of set top boxes. If a channel change request is received from set top box, the FCC unicast video output 512 can be accessed for the appropriate channel to provide a unicast video signal to the set top box.

The disclosed system and method can allow an improved user experience by providing rapid channel change in an IP multicast environment. The disclosed system and method provides a unicast video output from a server to a set top box in response to a channel change request. While the unicast video output is being received at the set top, box, the server joins the set top box to a multicast group associated with the channel request. Once the multicast group has been joined, the server stops communicating the unicast video output, and communicates a multicast video output associated with the multicast group to the set top box. This can result in faster channel change times and an improved user experience. For example, when a user selects a channel at a set top box, a unicast video output associated with the channel is broadcast to the set top box. The user is able to view the unicast video output while the set top box is joined to the multicast group. When the set top box has been joined to the multicast group, the user is receives a display of the multicast video output.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, from an acquisition server, a plurality of video streams via multicast at a unicast/multicast video server;
buffering each of the plurality of video streams within a buffer at the unicast/multicast video server;
generating at least one multicast video output at the buffer of the unicast/multicast video server, wherein the buffer is associated with a requested channel, and wherein the at least one multicast video output corresponds to a multicast video stream generated from a multicast replication point of the buffer;
generating at least one unicast video output at the buffer, the at least one unicast video output corresponding to a unicast video stream generated from the multicast video stream;
sending the unicast video output for the requested channel from the unicast/multicast video server to a first set top box of a plurality of set top boxes,
wherein the unicast/multicast video server continues sending the unicast video output for the requested channel to the first set top box until the first set top box has been joined to a multicast group associated with the requested channel; and
sending the multicast video output to the first set top box after the first set top box has been joined to the multicast group.

2. The method of claim 1, further comprising:
sending the at least one multicast video output from the unicast/multicast video server to the plurality of set top boxes.

3. The method of claim 1, wherein the memory comprises a fast channel change buffer operative to receive and buffer a video input, wherein the fast channel change buffer is operative to provide the multicast video output.

4. The method of claim 3, wherein the fast channel change buffer further comprises the multicast replication point operative to provide the multicast video output associated with the multicast group to the plurality of set top boxes including the first set top box.

5. The method of claim 4, wherein the multicast replication point is distinct from a unicast video output point of the fast channel change buffer.

6. The method of claim 5, wherein the multicast replication point is at a beginning portion of the fast channel change buffer and the unicast video output point is at an end portion of the fast channel change buffer.

7. The method of claim 3, wherein the UMV server is further configured to use the fast channel change buffer as an error correction buffer.

8. A method comprising:
sending a channel change request corresponding to a selected channel from a set top box to a first server;

determining, at the set top box, whether the first server is in service;

when the first server is in service, receiving a unicast video output from the first server at the set top box, the unicast video output corresponding to a unicast video stream for the selected channel, wherein the first server continues sending the unicast video output for the selected channel to the set top box until the set top box has been joined to a multicast group associated with the selected channel;

when the first server is in service, receiving a multicast video output corresponding to the selected channel from the first server at the set top box after the set top box has been joined to the multicast group, wherein a buffer within the first server is associated with the selected channel, and wherein the unicast video output and the multicast video output are generated at the buffer; and when the first server is not in service, transmitting a request for one of a plurality of multicast video streams from the set top box to a remote acquisition server that provides a multicast video stream of the selected channel to the first server when the first server is in service; and detecting, at the set top box, that the first server has returned to service.

9. The method of claim 8, wherein the unicast video output and the multicast video output are both based on a buffered multicast video stream.

10. The method of claim 8, further comprising:
when the set top box determines that the first server has returned to service, receiving the multicast video output from the first server at the set top box.

11. A server comprising:
a processor;
a non-transitory computer readable storage medium accessible by the processor; and
a computer program embedded within the non-transitory computer readable storage medium, the computer program comprising:
instructions to receive a plurality of video streams via multicast from an acquisition server;
instructions to buffer the plurality of video streams within a plurality of buffers to form a plurality of buffered multicast video streams;
instructions to generate at least one multicast video output from at least a multicast replication point of at least one of the plurality of buffers;
instructions to generate at least one unicast video stream from the at least one of the plurality of buffers, wherein the at least one of the plurality of buffers is associated with a requested channel;
instructions to send the at least one unicast video stream from the server to a set top box for the requested channel;
instructions to continue sending the at least one unicast video stream for the requested channel to the set top box until the set top box has been joined to a multicast group associated with the requested channel; and
instructions to send the at least one multicast video output associated with the multicast group to the set top box, the at least one multicast video output generated from a buffered multicast video stream of the plurality of buffered multicast video streams associated with the requested channel.

12. The server of claim 11, wherein the computer program further comprises instructions to receive a channel change request from the set top box.

13. The server of claim 11, further comprising:
a fast channel change buffer operative to receive and buffer a video input, wherein the fast channel change buffer is operative to provide the buffered multicast video stream.

14. The server of claim 13, wherein the fast channel change buffer further comprises a multicast replication point operative to send the at least one multicast video output associated with the multicast group to a plurality of set top boxes including the set top box.

15. A set top box, comprising:
a processor;
a non-transitory computer readable storage medium accessible to the processor; and
a computer program embedded within the non-transitory computer readable storage medium, the computer program comprising:
instructions to receive a channel change request corresponding to a requested channel;
instructions to determine whether a first server is in service;
instructions to transmit an output to the first server when the first server is in service, wherein the output includes the channel change request;
instructions to continue receiving a unicast video output associated with the requested channel while the first server joins the set top box to a multicast group associated with the requested channel when the first server is in service;
instructions to receive a multicast video output from the first server after the first server joins the set top box to the multicast group when the first server is in service, wherein a buffer within the first server is associated with the selected channel, and wherein the unicast video output and the multicast video output are generated at the buffer;
instructions to transmit a request to receive the multicast video output from an acquisition server when the first server is not in service, wherein the remote acquisition server provides the multicast video output of the requested channel to the first channel when the first channel is in service; and
instructions to sense when the first server has returned to service.

16. The set top box of claim 15, wherein the computer program further comprises:
instructions to receive the multicast video output from the first server in response to sensing that the first server has returned to service.

* * * * *